United States Patent
Sato et al.

(10) Patent No.: US 12,308,931 B2
(45) Date of Patent: May 20, 2025

(54) COMMUNICATION APPARATUS, WIRELESS COMMUNICATION SYSTEM, AND TRANSMISSION RANK SWITCHING METHOD

(71) Applicant: Fujitsu Limited, Kawasaki (JP)

(72) Inventors: Kazuto Sato, Yokohama (JP); Daisuke Jitsukawa, Adachi (JP); Shin Hosokawa, Yokosuka (JP); Takato Ezaki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 107 days.

(21) Appl. No.: 18/234,200

(22) Filed: Aug. 15, 2023

(65) Prior Publication Data

US 2024/0171255 A1 May 23, 2024

(30) Foreign Application Priority Data

Nov. 17, 2022 (JP) .................................. 2022-184081

(51) Int. Cl.
*H04B 7/08* (2006.01)
*H04B 7/0456* (2017.01)

(52) U.S. Cl.
CPC ......... *H04B 7/0857* (2013.01); *H04B 7/0486* (2013.01)

(58) Field of Classification Search
CPC ..... H04B 7/0857; H04B 7/0486; H04B 7/063
See application file for complete search history.

(56) References Cited

U.S. PATENT DOCUMENTS

| | | | | |
|---|---|---|---|---|
| 8,982,693 | B2* | 3/2015 | Krishnamurthy | H04W 72/23 370/216 |
| 9,036,608 | B2* | 5/2015 | Chen | H04W 24/10 370/310.2 |
| 9,094,868 | B2* | 7/2015 | Tellado | H04W 24/08 |
| 9,198,070 | B2* | 11/2015 | Krishnamurthy | H04L 1/0036 |
| 9,392,440 | B2* | 7/2016 | Goransson | H04B 7/0413 |
| 9,699,779 | B2* | 7/2017 | Marinier | H04W 72/1268 |
| 9,712,306 | B2* | 7/2017 | Ji | H04L 1/0003 |
| 9,750,030 | B2* | 8/2017 | Barbieri | H04L 1/0003 |
| 9,763,050 | B2* | 9/2017 | Belghoul | H04W 4/02 |
| 9,774,377 | B2* | 9/2017 | Qiang | H04W 72/542 |
| 9,807,783 | B2* | 10/2017 | Park | H04L 1/0015 |
| 2023/0396356 | A1* | 12/2023 | Pauli | H04L 5/0055 |
| 2024/0063938 | A1* | 2/2024 | Jovanovic | H04L 1/0009 |

(Continued)

FOREIGN PATENT DOCUMENTS

JP 2020-519096 A 6/2020
JP 2020-522930 A 7/2020

(Continued)

*Primary Examiner* — Berhanu Tadese
(74) *Attorney, Agent, or Firm* — Myers Wolin, LLC

(57) ABSTRACT

A communication apparatus that communicates with a terminal device using a multi-input multi-output (MIMO) data transfer method includes: a memory; and a processor coupled to the memory and configured to: estimate a reception signal to interference ratio (SIR) of a wireless propagation path between the communication apparatus and the terminal device; acquire an SIR offset value for a transmission rank based on a state of occurrence of transfer errors; and switch the transmission rank based on the reception SIR and an SIR offset value for the transmission rank.

11 Claims, 11 Drawing Sheets

(56) References Cited

U.S. PATENT DOCUMENTS

| | | | | |
|---|---|---|---|---|
| 2024/0121841 A1* | 4/2024 | Yum | .................. | H04L 1/0001 |
| 2024/0154673 A1* | 5/2024 | Liu | .................. | H04B 7/0639 |
| 2024/0171255 A1* | 5/2024 | Sato | .................. | H04B 7/0857 |
| 2024/0204910 A1* | 6/2024 | Soldati | .................. | H04W 76/20 |
| 2024/0224313 A1* | 7/2024 | Gu | .................. | H04L 5/0044 |
| 2024/0243787 A1* | 7/2024 | Kotamraju | .................. | H04B 7/0691 |
| 2024/0267152 A1* | 8/2024 | Bin Sediq | .................. | H04L 1/0021 |
| 2024/0276290 A1* | 8/2024 | Bangolae | .................. | G06F 9/4843 |
| 2024/0297743 A1* | 9/2024 | Andgart | .................. | H04L 1/1864 |

FOREIGN PATENT DOCUMENTS

| | | | | |
|---|---|---|---|---|
| JP | 2020-533886 A | 11/2020 | | |
| WO | WO-2012019449 A1 * | 2/2012 | .......... | H04B 7/0413 |
| WO | WO-2012139398 A1 * | 10/2012 | .......... | H04B 7/0689 |
| WO | WO-2013019243 A1 * | 2/2013 | .......... | H04L 1/0003 |
| WO | WO-2014072782 A2 * | 5/2014 | .......... | H04B 7/0413 |
| WO | WO-2014113760 A1 * | 7/2014 | .......... | H04L 1/0003 |
| WO | WO-2014179917 A1 * | 11/2014 | .......... | H04B 7/0486 |
| WO | 2018/201908 A1 | 11/2018 | | |
| WO | 2018/223088 A1 | 12/2018 | | |
| WO | 2019/051487 A1 | 3/2019 | | |
| WO | WO-2021221964 A1 * | 11/2021 | .......... | H04B 7/0452 |

\* cited by examiner

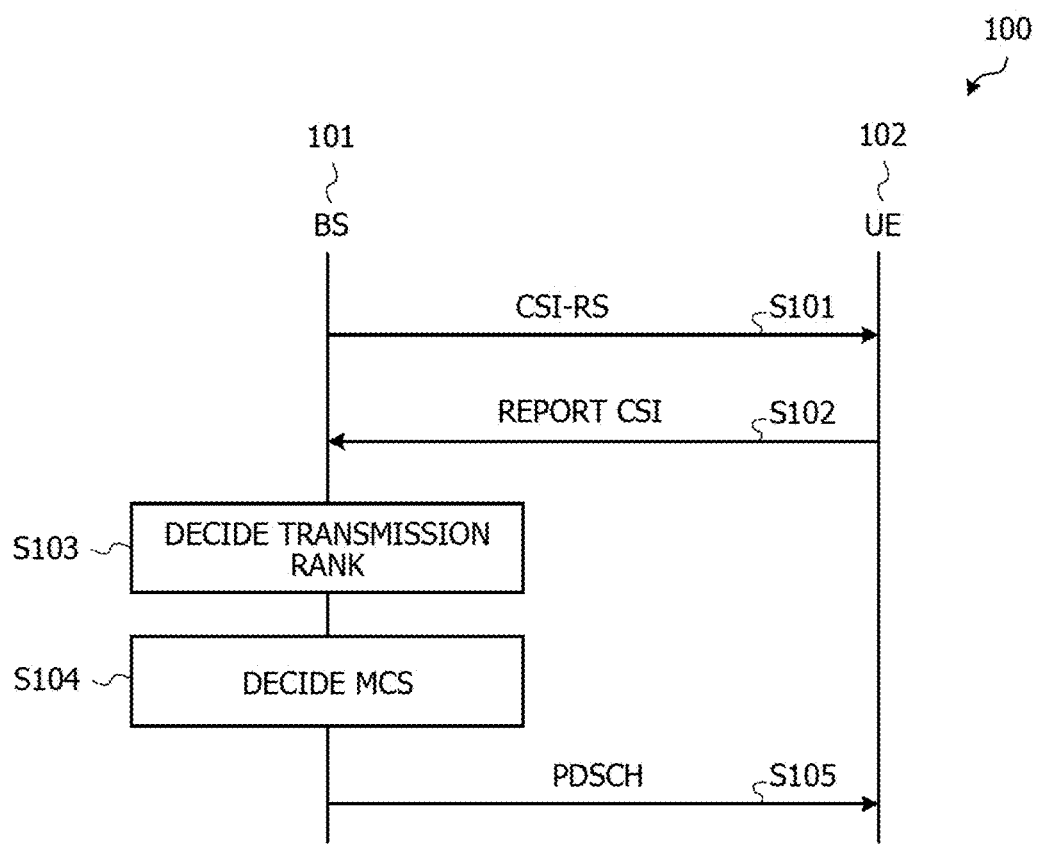

COMMUNICATION APPARATUS, WIRELESS COMMUNICATION SYSTEM, AND TRANSMISSION RANK SWITCHING METHOD

CROSS-REFERENCE TO RELATED APPLICATION

This application is based upon and claims the benefit of priority of the prior Japanese Patent Application No. 2022-184081, filed on Nov. 17, 2022, the entire contents of which are incorporated herein by reference.

FIELD

The embodiment discussed herein is related to a communication apparatus, a wireless communication system, and a transmission rank switching method.

BACKGROUND

For example, in 5th generation (5G) new radio (NR), control for optimizing a downlink (DL) transmission format is widely known. FIG. 10 is a sequence diagram illustrating an example of the processing operation of a wireless communication system related to DL transmission setting processing. A wireless communication system 100 illustrated in FIG. 10 includes a base station (BS) 101 and user equipment (UE) 102. The BS 101 communicates with the UE 102 by using a multi-input multi-output (MIMO) data transfer method. For example, the BS 101 is a base station apparatus including a central unit (CU) and a distributed unit (DU). For example, the UE 102 is a mobile station such as a smartphone that wirelessly communicates with the BS 101.

Japanese National Publication of International Patent Application No. 2020-519096, Japanese National Publication of International Patent Application No. 2020-522930, and Japanese National Publication of International Patent Application No. 2020-533886 are disclosed as related art.

SUMMARY

According to an aspect of the embodiments, a communication apparatus that communicates with a terminal device using a multi-input multi-output (MIMO) data transfer method includes: a memory; and a processor coupled to the memory and configured to: estimate a reception signal to interference ratio (SIR) of a wireless propagation path between the communication apparatus and the terminal device; acquire an SIR offset value for a transmission rank based on a state of occurrence of transfer errors; and switch the transmission rank based on the reception SIR and an SIR offset value for the transmission rank.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

BRIEF DESCRIPTION OF DRAWINGS

FIG. 10 is a sequence diagram illustrating an example of the processing operation of a wireless communication system related to DL transmission setting processing.

DESCRIPTION OF EMBODIMENTS

Figure 1:
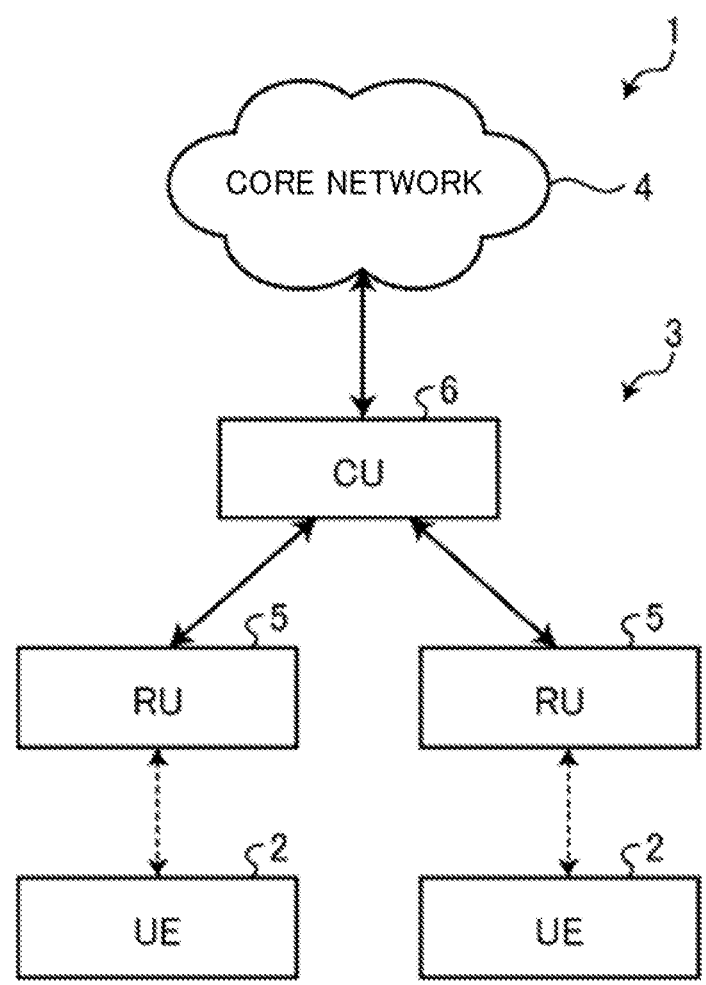
FIG. 1 is an explanatory diagram illustrating an example of a wireless communication system of the present embodiment.

The BS 101 transmits a channel state information reference signal (CSI-RS) to the UE 102 (step S101). A CSI-RS is a DL-specific reference signal.

The UE 102 transmits CSI generated based on the CSI-RS received from the BS 101, to the BS 101 by using a physical uplink control channel (PUCCH) (step S102). The CSI includes a rank indicator (RI) and a channel quality indicator (CQI). An RI is an indicator of a transmission rank indicating the number of layers (spatial streams) that are simultaneously transmitted in MIMO. A CQI is a channel quality indicator indicating a preferable modulation and coding scheme (MCS).

When the CSI is received, the BS 101 decides the transmission rank for DL based on the RI in the received CSI (step S103).

The BS 101 decides the MCS for DL by using an outer-loop control method based on the CQI in the received CSI (step S104). As the outer-loop control method, the BS 101 refers to a signal to interference ratio (SIR) conversion table in which a CQI and a reception SIR are associated with each other, and performs conversion into the reception SIR corresponding to the CQI in the received CSI. The BS 101 updates an SIR offset value based on the target value of transfer error rate and the latest transfer error rate. The BS 101 corrects the reception SIR by using the updated SIR offset value. The BS 101 refers to an MCS conversion table in which a reception SIR and an MCS are associated with each other, and decides the MCS for DL corresponding to the corrected reception SIR.

The BS 101 sets a physical downlink shared channel (PDSCH) to the UE 102 based on the decided transmission rank for DL and the decided MCS for DL (step S105). A PDSCH is a physical channel used for transmitting and receiving a data packet in the downlink between the BS 101 and the UE 102.

However, reception of CSI may not be accurately performed every time in the BS 101, and a situation in which the reliability of the content of CSI is low is concerned.

Even in the case where the reliability of CSI is low, the BS 101 may decide an appropriate MCS for DL by using the outer-loop control method.

However, in the case where the reliability of the CSI reported from the UE 102 is low, it is difficult for the BS 101 to appropriately execute control for deciding the transmission rank of MIMO according to a communication environment. Although the difficulty is noticeable in the case where the reliability of the CSI reported from the UE 102 is low, it is difficult for the BS 101 to appropriately execute control for deciding the transmission rank of MIMO according to a communication environment without using an RI, regardless of whether the reliability is low.

According to one aspect, it is an object to provide a communication apparatus and the like capable of deciding an appropriate transmission rank according to a communication environment.

Hereinafter, with reference to the drawings, an embodiment of a communication apparatus and the like disclosed in the present application will be described in detail. The present embodiment does not limit the disclosed technology. The embodiments described below may be combined as appropriate within a range not causing any contradiction.

Embodiment 1

FIG. 1 is an explanatory diagram illustrating an example of a wireless communication system 1 of the present embodiment. The wireless communication system 1 illustrated in FIG. 1 is a 5G wireless communication system. The wireless communication system 1 includes a plurality of pieces of user equipment (UE) 2, a base station (BS) 3, and a core network 4. The BS 3 is a base station apparatus that wirelessly communicates with the UE 2 by using a multi-input multi-output (MIMO) data transfer method. The BS 3 includes a plurality of radio units (RUs) 5 and a central unit (CU) 6. The CU 6 also includes the function of a distributed unit (DU). The CU 6 may treat the RUs 5 collectively as one communication apparatus.

The CU 6 communicates with the core network 4 by wire, and communicates with the plurality of RUs 5 by wire. The CU 6 is a communication apparatus that executes main baseband signal processing in the BS 3 and executes processing related to selection of an RI.

The RU 5 wirelessly communicates with the UE 2 that moves within the area of the RU 5. The RU 5 is a communication unit that executes wireless transmission and reception processing and a part of baseband signal processing in the BS 3.

For example, the UE 2 is a terminal device such as a smartphone or a tablet terminal that wirelessly communicates with the RU 5 in the BS 3. The UE 2 reports channel state information (CSI) to the CU 6 via the RU 5 by using a physical uplink control channel (PUCCH). The CSI includes a rank indicator (RI) and a channel quality indicator (CQI). An RI is an indicator of a transmission rank indicating the number of layers (spatial streams) that are simultaneously transmitted in MIMO. A CQI is a channel quality indicator indicating a preferable modulation and coding scheme (MCS).

Figure 2:
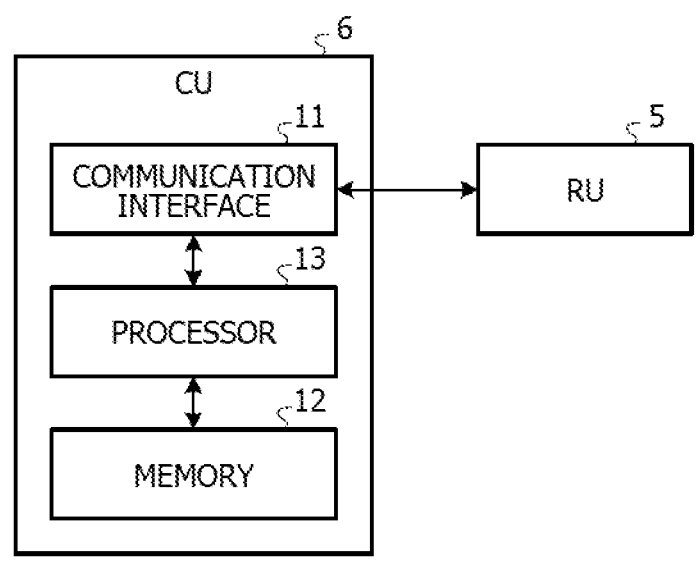
FIG. 2 is a block diagram illustrating an example of the hardware configuration of a CU.

FIG. 2 is a block diagram illustrating an example of the hardware configuration of the CU 6. The CU 6 illustrated in FIG. 2 includes a communication interface 11, a memory 12, and a processor 13. The communication interface 11 is an interface that communicates with the core network 4 and the RU 5. The processor 13 controls the entire CU 6. The memory 12 stores various types of information. For example, the memory 12 stores information such as the reception SIR offset value for each transmission rank of MIMO, the decided transmission rank of MIMO for DL, and the decided MCS for DL. For example, the processor 13 executes baseband signal processing including the transmission rank of MIMO for DL and the MCS for DL.

Figure 3:
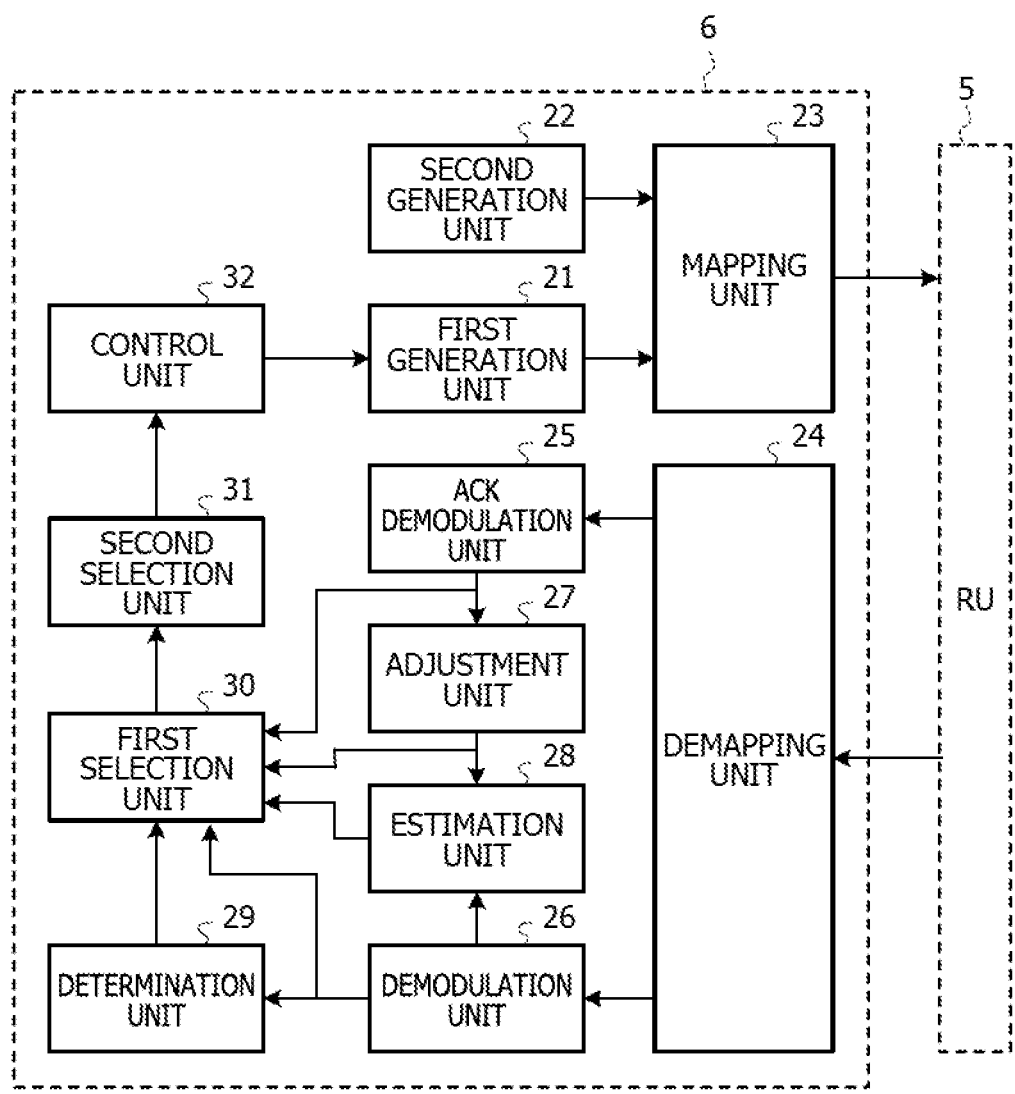
FIG. 3 is a block diagram illustrating an example of the functional configuration of the CU.

FIG. 3 is a block diagram illustrating an example of the functional configuration of the CU 6. The CU 6 illustrated in FIG. 3 includes a first generation unit 21, a second generation unit 22, a mapping unit 23, and a demapping unit 24. The CU 6 includes an ACK demodulation unit 25, a demodulation unit 26, an adjustment unit 27, and an estimation unit 28. The CU 6 includes a determination unit 29, a first selection unit 30, a second selection unit 31, and a control unit 32.

The first generation unit 21 generates a physical downlink shared channel (PDSCH) for downlink. The second generation unit 22 generates a channel state information reference signal (CSI-RS) for downlink. The mapping unit 23 maps the transmission signal of each DL physical channel to a DL transmission signal in a frequency domain. The demapping unit 24 extracts the uplink (UL) reception signal of each UL physical channel from the UL reception signals in a frequency domain.

The ACK demodulation unit 25 demodulates a UL control signal and extracts a hybrid automatic repeat request acknowledgement (HARQ-ACK) of a PDSCH. HARQ-ACK is a delivery confirmation signal by which the UE 2 reports whether a PDSCH is normally received in the UE 2. The demodulation unit 26 demodulates a UL control signal and extracts CSI reported from the UE 2. For example, the CSI includes an RI and a CQI.

The estimation unit 28 corrects a reception signal to interference ratio (SIR) derived from the CSI with an SIR offset value. For example, the estimation unit 28 refers to an SIR conversion table in which a CQI and a reception SIR are associated with each other, and performs conversion into the reception SIR corresponding to the CQI in the received CSI. The adjustment unit 27 adjusts the SIR offset value of the reception SIR by using (formula 1) based on HARQ-ACK, for example, the target value of transfer error rate and the latest transfer error rate.

$$SIR_{offset}(R) = \begin{cases} SIR_{offset}(R) + \Delta \cdot BLER_{target} \text{(Succeeded in} \\ \quad \text{reception of previous rank } R \text{ transfer)} \\ SIR_{offset}(R) - \Delta \cdot (1 - BLER_{target}) \text{(Failed in} \\ \quad \text{reception of previous rank R transfer)} \end{cases} \quad (1)$$

Step size: $\Delta$
Target error rate: $BLER_{target}$
Transmission rank: R

The estimation unit 28 corrects the reception SIR by using the SIR offset value that has been adjusted by the adjustment unit 27. For example, the estimation unit 28 obtains the corrected reception SIR by using (the SIR offset value after adjustment+the reception SIR before correction).

The determination unit 29 determines whether the reliability of the CSI reported by the UE 2 is low. For example, a case where the reliability of the CSI reported by the UE 2 is low is a case where the value of the CSI reported by the UE 2 does not change for a certain period of time, a case where CSI may not be received for a certain period of time (determined as non-transmission), a case where a decoding error of the CSI continues a plurality of times, for example, two or three times. For example, a certain period of time is a period of time decided based on a period of time by which CSI is predicted to change in a common sense even in the UE 2 in a stationary state. A case where the reliability of the CSI reported by the UE 2 is low may be a case where the value of the CSI does not change even though a result of quality measurement by an uplink sounding reference signal (SRS) changes.

The first selection unit 30 executes normal rank selection or rank selection based on the estimated value of reception SIR and the SIR offset value according to the determination result of the reliability of CSI. When the reliability of the CSI reported by the UE 2 is not low, the first selection unit 30 executes normal rank selection of selecting a transmission rank based on the RI in the CSI. When the reliability of the CSI reported by the UE 2 is low, the first selection unit 30 executes rank selection based on the estimated value of reception SIR and the SIR offset value.

The second selection unit 31 selects an MCS based on the reception SIR of the selected transmission rank. The second selection unit 31 decides the MCS for DL by using the outer-loop control method based on the CQI in the received CSI. As the outer-loop control method, the estimation unit 28 refers to an SIR conversion table in which a CQI and a reception SIR are associated with each other, and performs conversion into the reception SIR corresponding to the CQI in the received CSI. The adjustment unit 27 updates an SIR offset value based on the target value of transfer error rate and the latest transfer error rate. The adjustment unit 27 corrects the reception SIR with the updated SIR offset value. The second selection unit 31 refers to an MCS conversion table in which a reception SIR and an MCS are associated with each other, and selects an MCS for DL corresponding to the corrected reception SIR.

The control unit 32 sets the transmission rank selected by the first selection unit 30 and the MCS selected by the second selection unit 31, for new transmission of a PDSCH.

When it is determined that the reliability of CSI is low, the CU 6 selects, for example, switches an MCS and a transmission rank based on the estimated value of reception SIR and the SIR offset value for each transmission rank based on the state of occurrence of transfer errors.

Figure 4:
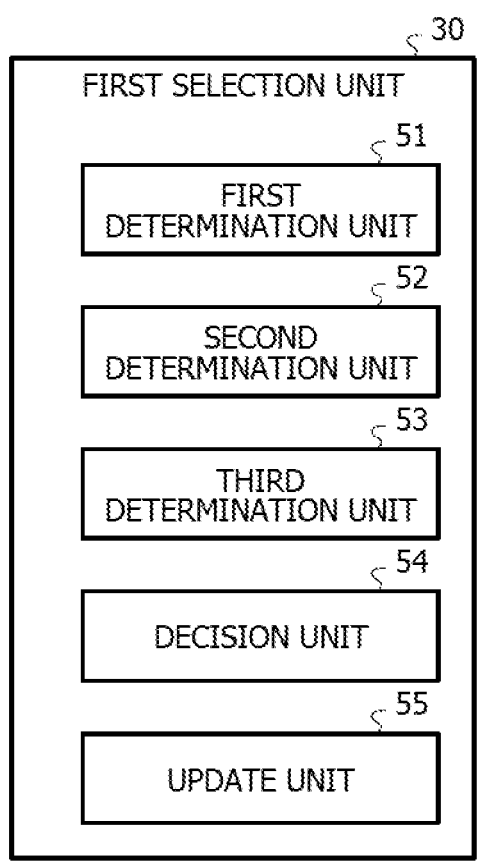
FIG. 4 is a block diagram illustrating an example of the functional configuration of a first selection unit.

FIG. 4 is a block diagram illustrating an example of the functional configuration of the first selection unit 30. The first selection unit 30 illustrated in FIG. 4 includes a first determination unit 51, a second determination unit 52, a third determination unit 53, a decision unit 54, and an update unit 55. The first determination unit 51 corrects a reception SIR with an SIR offset value, and determines whether the corrected reception SIR has exceeded a threshold for a higher transmission rank. For example, the threshold for a higher transmission rank corresponds to a reception SIR value in the vicinity where MCS is the highest when an MCS conversion table in which a reception SIR is converted into an MCS is referred to. The decision unit 54 decides and changes the transmission rank so as to increase the transmission rank when the first determination unit 51 has determined that the corrected reception SIR has exceeded the threshold.

The second determination unit 52 determines whether the difference between the SIR offset value for the current transmission rank and the SIR offset value for the transmission rank that is one rank lower than the current transmission rank has exceeded a threshold. For example, the threshold for difference is a value corresponding to a difference to the extent that the throughputs of the two transmission ranks to be compared are equivalent to each other. The decision unit 54 decides and changes the transmission rank so as to lower the transmission rank when the second determination unit 52 has determined that the difference has exceeded the threshold.

The third determination unit 53 determines whether transfer errors have occurred at a certain percentage in a certain number of times of data transfer after being changed to the current transmission rank. The decision unit 54 decides and changes the transmission rank so as to lower the transmission rank when the third determination unit 53 has determined that transfer errors have occurred at a certain percentage in a certain number of times of data transfer after the change. For example, the certain number of times and percentage are numerical values optimized by computer simulation or the like in which a standard communication environment is simulated.

When the transmission rank is changed, the update unit 55 replaces and updates the SIR offset value with a result obtained by performing weighted addition of the SIR offset value for the transmission rank before the change and the SIR offset value for the transmission rank after the change as the SIR offset value for the transmission rank after the change.

The first selection unit 30 selects a transmission rank based on data indicating the communication environment of each transmission rank (the SIR offset value for each transmission rank and the state of occurrence of transfer errors). As a result, even in the case where the reliability of the CSI reported from the UE 2 is low, the transmission rank for DL may be appropriately controlled according to a communication environment.

Figure 5:
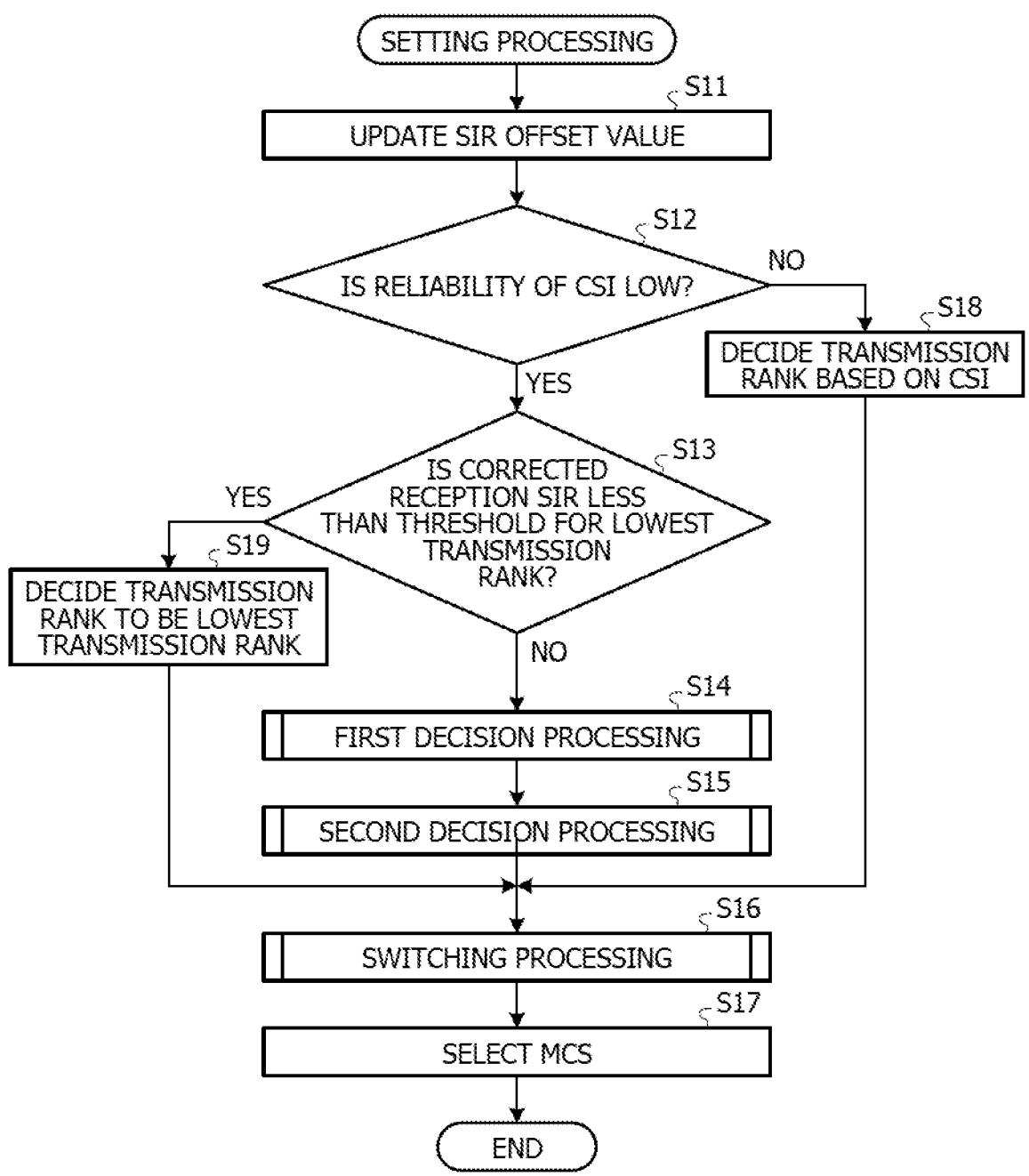
FIG. 5 is a flowchart illustrating an example of the processing operation of CU related to setting processing.

Next, the operation of the wireless communication system 1 of the present embodiment will be described. FIG. 5 is a flowchart illustrating an example of the processing operation of the CU 6 related to the setting processing. In FIG. 5, the adjustment unit 27 in the CU 6 updates the SIR offset value for the transmission rank in the previous transmission based on the state of transfer error by HARQ-ACK in the previous transmission (step S11). The determination unit 29 in the CU 6 determines whether the reliability of the CSI reported from the UE 2 is low (step S12).

When the reliability of the CSI is low (step S12: Yes), the first selection unit 30 in the CU 6 determines whether the corrected reception SIR is less than a threshold for the lowest transmission rank (step S13). For example, the threshold for the lowest transmission rank corresponds to a reception SIR value in the vicinity where MCS is the lowest when an MCS conversion table in which a reception SIR is converted into an MCS is referred to.

When the corrected reception SIR is not less than the threshold for the lowest transmission rank (step S13: No), the first selection unit 30 executes first decision processing illustrated in FIG. 6 in which a decision is made to lower the transmission rank (step S14).

Figure 7:
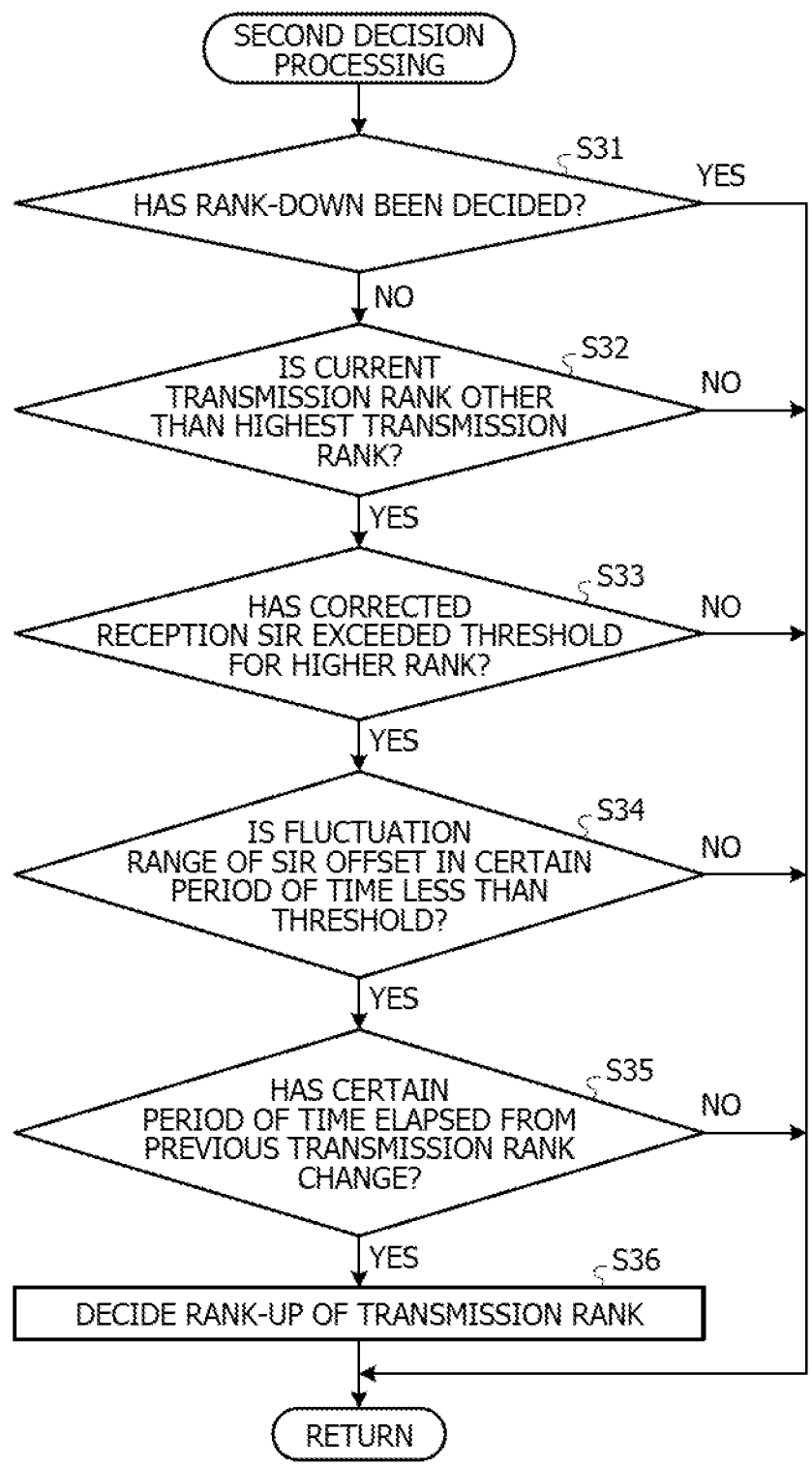
FIG. 7 is a flowchart illustrating an example of the processing operation of CU related to second decision processing.

After the first decision processing is executed, the first selection unit 30 executes second decision processing illustrated in FIG. 7 in which a decision is made to increase the transmission rank (step S15). After the second decision processing is executed, the first selection unit 30 executes switching processing illustrated in FIG. 8 (step S16).

After the switching processing is executed, the second selection unit 31 corrects the reception SIR by using the SIR offset value for the decided transmission rank, selects an MCS based on the corrected reception SIR (step S17), and ends the processing operation illustrated in FIG. 5.

When the reliability of the CSI is not low (step S12: No), the first selection unit 30 selects a transmission rank based on the RI in the CSI (step S18), and proceeds to the processing of step S16 in which the switching processing is executed.

When the corrected reception SIR is less than the threshold for the lowest transmission rank (step S13: Yes), the first selection unit 30 decides the transmission rank to be the lowest transmission rank (step S19), and proceeds to the processing of step S16 in which the switching processing is executed.

Figure 6:
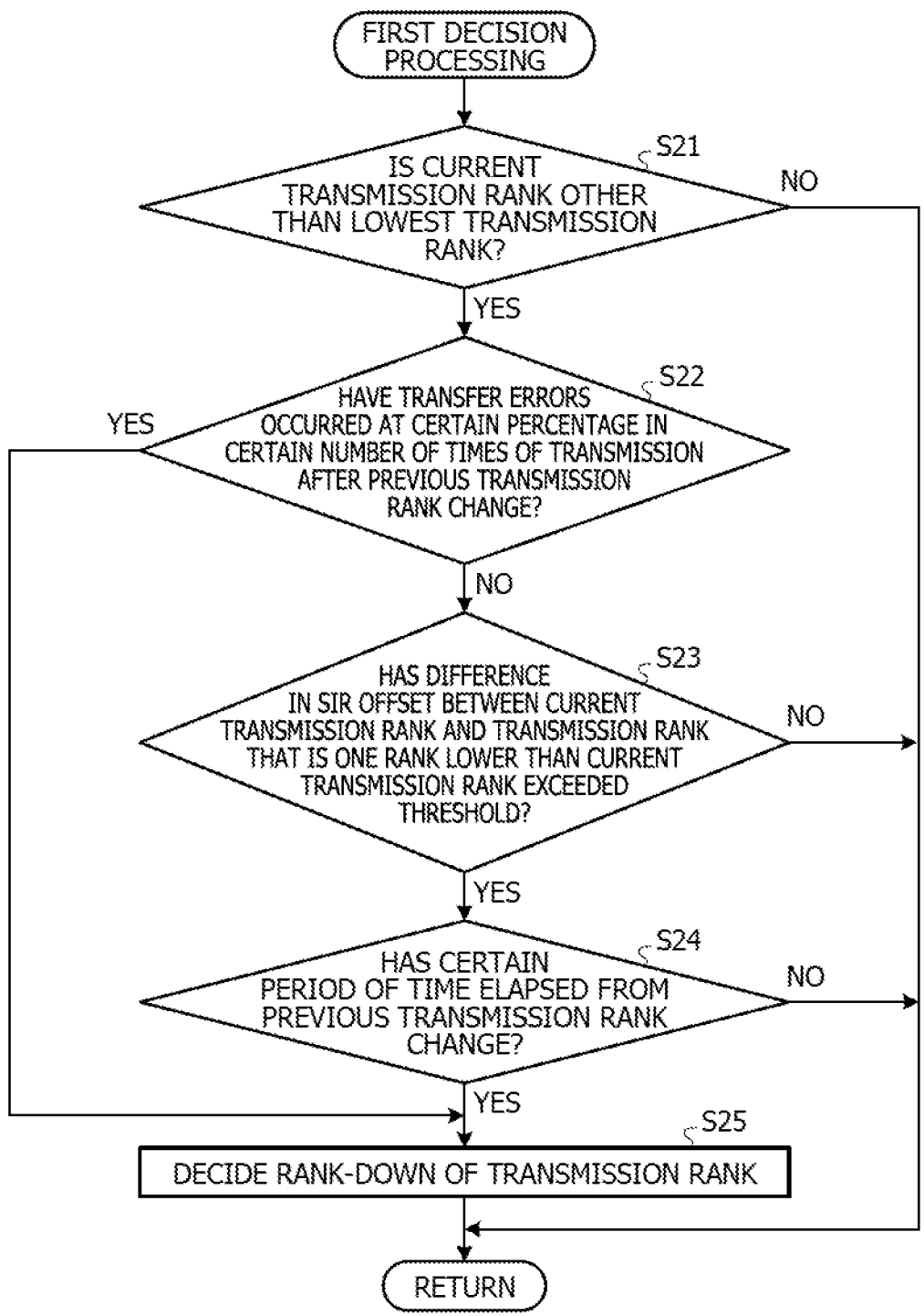
FIG. 6 is a flowchart illustrating an example of the processing operation of CU related to first decision processing.

FIG. 6 is a flowchart illustrating an example of the processing operation of the CU 6 related to the first decision processing. In FIG. 6, the first selection unit 30 in the CU 6 determines whether the current transmission rank is other than the lowest transmission rank (step S21).

When the current transmission rank is other than the lowest transmission rank (step S21: Yes), the first selection unit 30 judges that there is room for changing the transmission rank. The third determination unit 53 in the first selection unit 30 determines whether transfer errors have occurred by more than a certain percentage in a certain number of times of transmission after the previous transmission rank change (step S22). When transfer errors have occurred by more than a certain percentage in a certain number of times of transmission after the previous transmission rank change (step S22: Yes), the decision unit 54 in the first selection unit 30 decides rank-down of lowering the current transmission rank (step S25), and ends the processing operation illustrated in FIG. 6. As a result, frequent occurrence of transfer errors may be suppressed by performing a trial of increasing the transmission rank, and then judging that the current transmission rank is not suitable for the communication environment and lowering the transmission rank.

When transfer errors have not occurred by more than a certain percentage (step S22: No), the second determination unit 52 determines whether the difference between the SIR offset value for the current transmission rank and the SIR offset value for the transmission rank that is one rank lower has exceeded a threshold (step S23).

When the difference has exceeded the threshold (step S23: Yes), the decision unit 54 judges that the current transmission rank is significantly lower than the transmission rank that is one rank lower with respect to the corrected reception SIR. When the difference between the SIR offset value for the current transmission rank and the SIR offset value for the transmission rank that is one rank lower has exceeded the threshold, the decision unit 54 determines whether a certain period of time has elapsed from the previous transmission rank change (step S24).

When a certain period of time has elapsed from the previous transmission rank change (step S24: Yes), the decision unit 54 proceeds to the processing of step S25 in which rank-down of lowering the current transmission rank is decided. For example, the certain period of time set in step S24 is a period of time for the MCS selected by the outer-loop control method to be converged.

When the current transmission rank is not other than the lowest transmission rank (step S21: No), for example, when the current transmission rank is the lowest transmission rank, the first selection unit 30 ends the first decision processing illustrated in FIG. 6.

When the difference between the SIR offset value for the current transmission rank and the SIR offset value for the transmission rank that is one rank lower has not exceeded the threshold (step S23: No), the second determination unit 52 ends the first decision processing illustrated in FIG. 6.

When a certain period of time has not elapsed from the previous transmission rank change (step S24: No), the decision unit 54 avoids a situation in which transmission rank-down frequently occurs, and ends the first decision processing illustrated in FIG. 6.

When transfer errors have occurred by more than a certain percentage in a certain number of times of transmission after the previous transmission rank change, the first selection unit 30 lowers the transmission rank. As a result, frequent occurrence of transfer errors may be suppressed by performing a trial of increasing the transmission rank, and then judging that the current transmission rank is not suitable for the communication environment and lowering the transmission rank.

When the difference between the SIR offset value for the current transmission rank and the SIR offset value for the transmission rank that is one rank lower has exceeded the threshold, the first selection unit 30 judges that the current transmission rank is significantly lower than the transmission rank that is one rank lower with respect to the corrected reception SIR. When a certain period of time has elapsed from the previous transmission rank change, the first selection unit 30 lowers the transmission rank. As a result, it is judged that the transfer rate at the current transmission rank is poorer, and the transfer rate may be improved by lowering the transmission rank. Furthermore, frequent occurrence of transfer errors may be avoided in a process in which the transmission rank is frequently changed.

For convenience of description, in FIG. 6, the processing of step S22 of determining whether the transfer error rate in a certain number of times of transmission after the previous transmission rank change has exceeded a threshold may be omitted. In this case, when the current transmission rank is other than the lowest transmission rank in step S21, the processing of step S23 may be executed.

FIG. 7 is a flowchart illustrating an example of the processing operation of the CU 6 related to the second decision processing. In FIG. 7, the first selection unit 30 in the CU 6 determines whether rank-down of transmission rank has been decided in the first decision processing of step S14 in the previous stage (step S31).

When rank-down has not been decided (step S31: No), the first selection unit 30 determines whether the current transmission rank is other than the highest transmission rank (step S32). When the current transmission rank is other than the highest transmission rank (step S32: Yes), the first determination unit 51 in the first selection unit 30 judges that there is room for changing the current transmission rank. The first determination unit 51 determines whether the corrected reception SIR has exceeded a threshold for a transmission rank higher than the current transmission rank (step S33). For example, the threshold for a higher transmission rank corresponds to a reception SIR value in the vicinity where MCS is the highest when an MCS conversion table in which a reception SIR is converted into an MCS is referred to.

When the corrected reception SIR has exceeded the threshold for a transmission rank higher than the current transmission rank (step S33: Yes), the first determination unit 51 judges that there is room for increasing the current transmission rank. As a result, since the reception SIR for the current transmission rank is sufficiently high and close to the upper limit of the transfer rate achievable with the current transmission rank, it may be considered that it is worth performing a trial of increasing the transmission rank. When the corrected reception SIR has exceeded the threshold for a transmission rank higher than the current transmission rank, the first determination unit 51 determines whether the fluctuation range of two SIR offset values sampled at a certain time interval is less than a threshold (step S34). For example, the threshold for fluctuation range is a value of about a difference in SIR between MCSs in an MCS conversion table. For example, the certain time interval in step S34 is a time interval that is shorter than the certain period of time in step S35 set to be shorter than the prohibition time period during which rank-down is prohibited so that a trial of performing rank-up of transmission rank may be easily performed.

When the fluctuation range of two sampled SIR offset values is less than the threshold (step S34: Yes), the decision unit 54 judges that the adjustment of SIR offset value performed at each time of transmission has converged and the SIR offset value is in a state of reflecting the actual communication environment. The decision unit 54 considers that the accuracy of determination in step S33 of determining whether the corrected reception SIR has exceeded the threshold for a transmission rank higher than the current transmission rank is high. When the fluctuation range of two sampled SIR offset values is less than the threshold, the decision unit 54 determines whether a certain period of time has elapsed from the previous transmission rank change (step S35). For example, the certain period of time in step S35 is a period of time set to be shorter than the prohibition time period during which rank-down is prohibited so that a trial of performing rank-up of transmission rank may be easily performed.

When a certain period of time has elapsed from the previous transmission rank change (step S35: Yes), the decision unit 54 decides rank-up of increasing the current transmission rank (step S36), and ends the second decision processing illustrated in FIG. 7.

When rank-down has been decided (step S31: Yes), the first selection unit 30 judges that there is no room for a rank-up of transmission rank, and ends the second decision processing illustrated in FIG. 7.

When the current transmission rank is not other than the highest transmission rank (step S32: No), the first selection unit 30 judges that there is no room for increasing the transmission rank since the current transmission rank is the highest transmission rank, and ends the second decision processing illustrated in FIG. 7.

When the corrected reception SIR has not exceeded the threshold for a transmission rank higher than the current transmission rank (step S33: No), the first selection unit 30 judges that there is no room for increasing the current transmission rank, and ends the second decision processing illustrated in FIG. 7.

When the fluctuation range of two SIR offset values sampled at a certain time interval is not less than the threshold (step S34: No), the first selection unit 30 judges that there is no room for increasing the current transmission rank, and ends the second decision processing illustrated in FIG. 7.

When a certain period of time has not elapsed from the previous transmission rank change (step S35: No), the first selection unit 30 ends the second decision processing illustrated in FIG. 7 in order to avoid frequent occurrence of rank change.

When the corrected reception SIR has exceeded the threshold for a transmission rank higher than the current transmission rank, the fluctuation range of two sampled SIR offset values is less than the threshold, and a certain period of time has elapsed from the previous transmission rank change, the first selection unit 30 increases the current transmission rank. As a result, since the reception SIR for the current transmission rank is sufficiently high and close to the upper limit of the transfer rate achievable with the current transmission rank, it may be judged that it is worth executing a trial of increasing the transmission rank. Furthermore, frequent occurrence of transfer errors may be avoided in a process in which the transmission rank is frequently changed.

Figure 8:
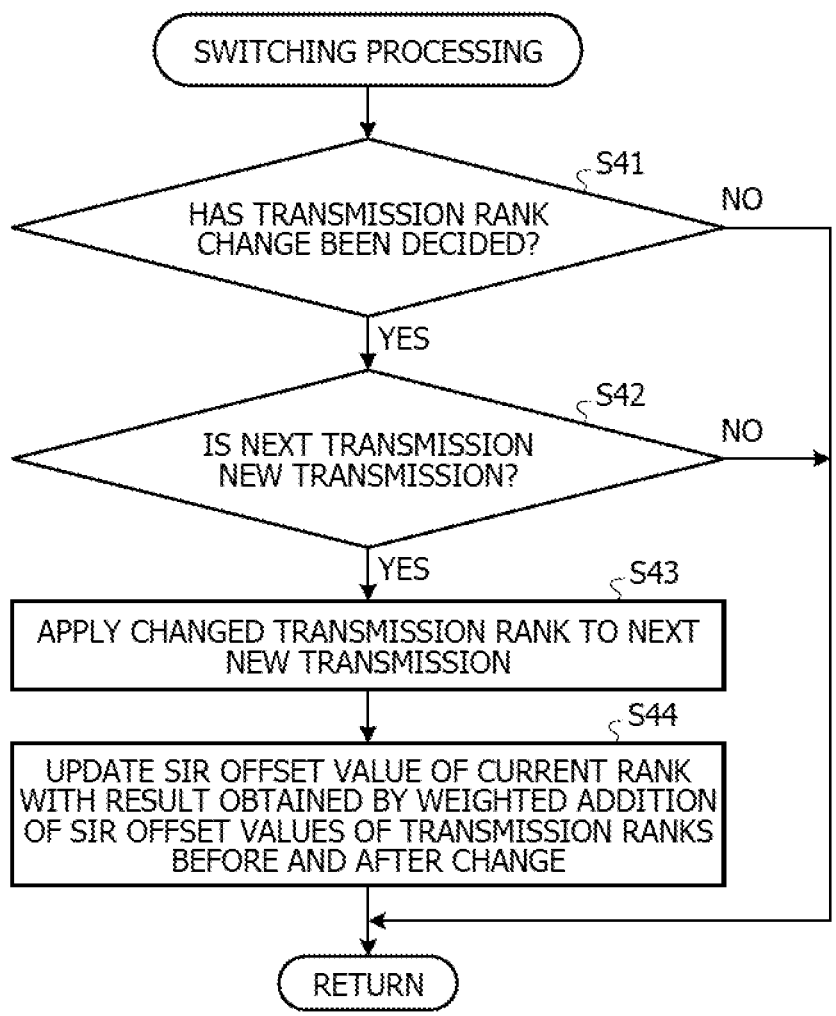
FIG. 8 is a flowchart illustrating an example of the processing operation of CU related to switching processing.

FIG. 8 is a flowchart illustrating an example of the processing operation of the CU 6 related to the switching processing. In FIG. 8, the first selection unit 30 in the CU 6 determines whether transmission rank change has been decided (step S41).

When transmission rank change has been decided (step S41: Yes), the first selection unit 30 judges that the transmission rank has been decided in the first decision processing or the second decision processing, and determines whether the next transmission is new transmission (step S42).

When the next transmission is new transmission (step S42: Yes), the first selection unit 30 applies the changed transmission rank to the new next transmission (step S43). As a result, by applying the change of transmission rank after retry re-transmission is completed, a situation in which the transmission ranks are different between the initial transmission and the re-transmission may be avoided.

The update unit 55 in the first selection unit 30 performs weighted addition of the SIR offset value for the transmission rank before the change and the SIR offset value for the transmission rank after the change, and replaces and updates the SIR offset value with the addition result as the SIR offset value of the transmission rank after the change (step S44). The update unit 55 ends the switching processing illustrated in FIG. 8. For example, a weighted addition result may be an average value, or weighting may be performed with a ratio between the SIR offset value of the transmission rank before the change and the SIR offset value of the transmission rank after the change of 1:0 or 0:1. It may be changed as appropriate. For example, the update unit 55 may replace the SIR offset value with the average value of the SIR offset value for the transmission rank before the change and the SIR offset value for the transmission rank after the change as the SIR offset value for the transmission rank after the change. As a result, weighted addition of the SIR offset value reflecting the past communication environment and the SIR offset value reflecting the communication environment up to immediately before the change while having a different transmission rank, is performed. As a result, it is possible to select a more appropriate transmission rank without excessively continuing to use the past communication environment different from the current communication environment.

When transmission rank change has not been decided (step S41: No) or when the next transmission is not new transmission (step S42: No), the first selection unit 30 judges that the transmission rank is not to be switched, and ends the switching processing illustrated in FIG. 8.

The first selection unit 30 performs weighted addition of the SIR offset value for the transmission rank before the change and the SIR offset value for the transmission rank after the change, and replaces the SIR offset value with the addition result as the SIR offset value of the current rank. For example, weighted addition of the SIR offset value reflecting the past communication environment and the SIR offset value reflecting the communication environment up to immediately before the change while having a different transmission rank, is employed. As a result, it is possible to select a more appropriate transmission rank without excessively continuing to use the past communication environment different from the current communication environment.

Figure 9A:
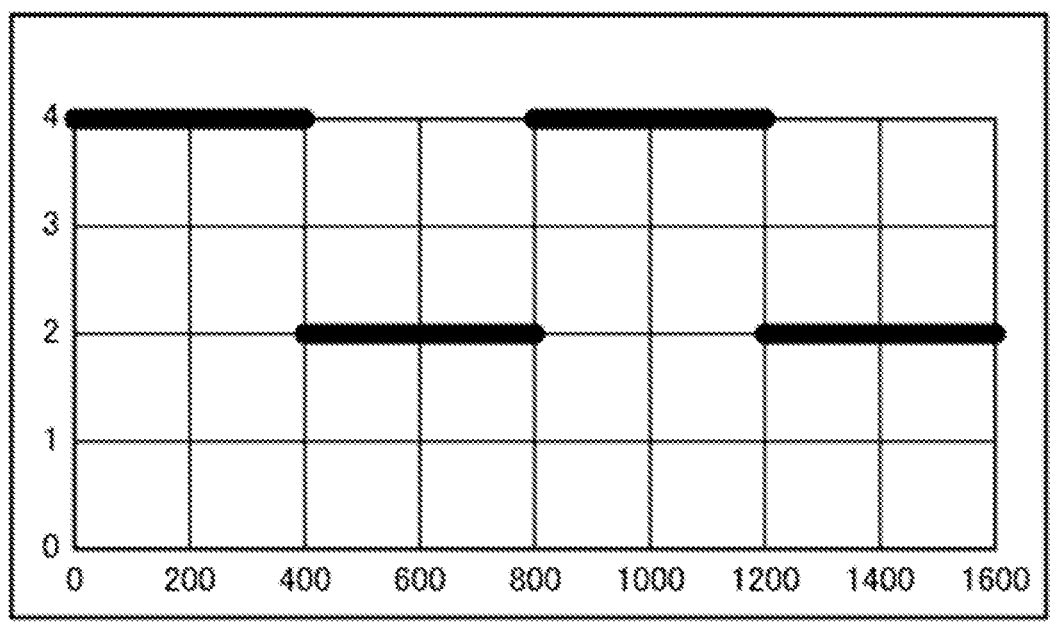
FIG. 9A is an explanatory diagram illustrating an example of the course of change of transmission rank of a comparative example.

FIG. 9A is an explanatory diagram illustrating an example of the course of change of transmission rank of a comparative example. A CU of a BS of the comparative example switches the transmission rank based on an RI in CSI. In the course of change illustrated in FIG. 9A, the horizontal axis represents time and the vertical axis represents transmission rank. For example, the transmission rank is "4" in the time period of 0 to less than 400, and the transmission rank is changed to "2" in the time period of 400 to less than 800, the transmission rank is changed to "4" in the time period of 800 to less than 1200, and the transmission rank is changed to "2" in the time period of 1200 to less than 1600. For example, the transmission rank is changed in accordance with the course of change illustrated in FIG. 9A since the communication environment is degraded at the timings of 400 hours and 1200 hours and the communication environment is improved at the timing of 800 hours.

Figure 9B:
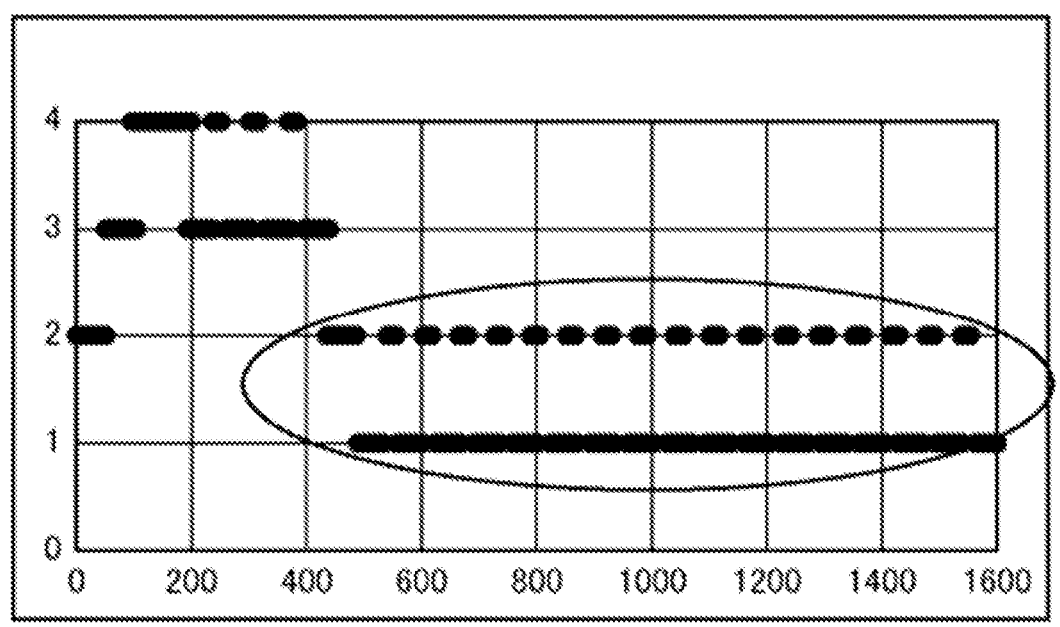
FIG. 9B is an explanatory diagram illustrating an example of the course of change of transmission rank of the comparative example in a case where SIR offset values are not weighted.

FIG. 9B is an explanatory diagram illustrating an example of the course of change of transmission rank of the comparative example in a case where SIR offset values are not weighted. The course of change in FIG. 9B is for a case where the first selection unit 30 of the comparative example without the weighting of SIR offset values in step S44 is employed. An SIR offset value is updated when a corresponding transmission rank is selected. For example, in a case where the frequency of selecting a certain transmission rank is low, by the corresponding SIR offset value deviating from the actual environment, there is a case where a condition for lowering the transmission rank is satisfied. The condition for lowering is a case where the difference between the SIR offset value for the current transmission rank and the SIR offset value for the transmission rank that is one rank lower than the current transmission rank is large. In the time period of 400 and later, a state is entered in which a transmission rank corresponding to the communication environment may not be selected since the condition of lowering the transmission rank to transmission rank 1 and the condition of increasing the transmission rank to transmission rank 2 are alternately satisfied.

Figure 9C:
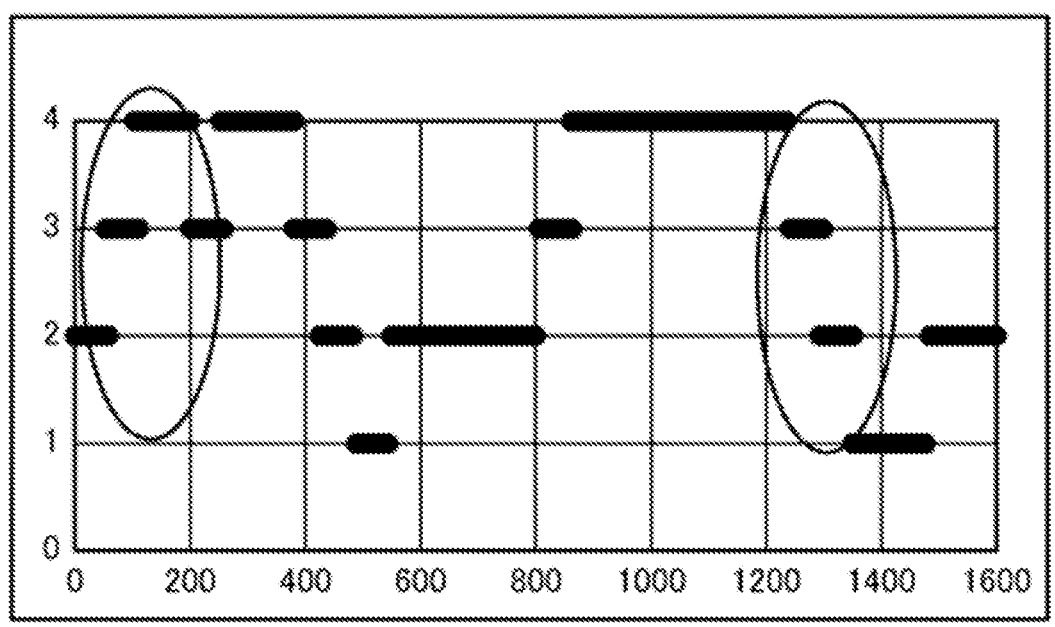
FIG. 9C is an explanatory diagram illustrating an example of the course of change of transmission rank of the present embodiment in a case where SIR offset values are weighted.

FIG. 9C is an explanatory diagram illustrating an example of the course of change of transmission rank of the present embodiment in a case where SIR offset values are weighted. The course of change illustrated in FIG. 9C is for a case where the first selection unit 30 with the weighting of SIR offset values in step S44 is employed. For example, in the time period of 0 to less than 400, the transmission rank is changed in stages in the order of "2", "3", "4", "3", "4", and "3". In the time period of 400 to less than 800, the transmission rank is changed in stages in the order of "3", "2", "1", and "2". In the time period of 800 to less than 1200, the transmission rank is changed in stages in the order of "3" and "4". In the time period of 1200 to less than 1600, the transmission rank is changed in stages in the order of "4", "3", "2", "1", and "2". A situation may be avoided in which the condition for lowering the transmission rank and the condition for increasing the transmission rank are alternately satisfied due to the fact that the SIR offset value corresponding to the transmission rank with a low selection frequency deviates from the actual environment. As a result, as compared with the comparative example, the first selection unit 30 may select an appropriate transmission rank according to a communication environment by changing the transmission rank in stages.

The CU 6 of the present embodiment switches the transmission rank based on the reception SIR estimated by the estimation unit 28 and the SIR offset value for each transmission rank acquired by the adjustment unit 27. As a result, an appropriate transmission rank may be decided according to a communication environment.

When it is determined that the reliability of the CSI received from the UE 2 is low, the CU 6 switches the transmission rank based on the estimated reception SIR and the acquired SIR offset value for each transmission rank. As a result, even in the case where the reliability of the CSI received from the UE 2 is low, an appropriate transmission rank may be decided according to a communication environment.

The CU 6 switches the transmission rank and sets the changed transmission rank to a PDSCH to the UE 2. As a result, an optimum PDSCH may be secured.

The CU 6 corrects a reception SIR with an SIR offset value, determines whether the corrected reception SIR has exceeded a threshold, and increases the transmission rank when the corrected reception SIR has exceeded the threshold. As a result, since the reception SIR for the current transmission rank is sufficiently high, an optimum communication environment may be achieved by increasing the transmission rank.

The CU 6 determines whether the fluctuation range of two SIR offset values sampled at a certain time interval is less than a threshold, and increases the transmission rank when the fluctuation range of two SIR offset values is less than the threshold. As a result, it may be judged that the adjustment of SIR offset value performed at each time of transmission has converged and the SIR offset value is in a state of reflecting the actual communication environment.

The CU 6 lowers the transmission rank when the difference between the SIR offset value for the current transmission rank and the SIR offset value for the transmission rank that is one rank lower than the current transmission rank has exceeded a threshold. As a result, it may be judged that the current transmission rank is significantly lower than the transmission rank that is one rank lower with respect to the corrected reception SIR, and an optimum communication environment may be achieved.

The CU 6 lowers the transmission rank when transfer errors have occurred at a certain percentage in a certain number of times of data transfer after being changed to the current transmission rank. As a result, frequent occurrence of transfer errors may be suppressed by performing a trial of increasing the transmission rank, and then judging that the current transmission rank is not suitable for the communication environment and lowering the transmission rank.

When the transmission rank is switched, the CU 6 replaces the SIR offset value with a result obtained by performing weighted addition of the SIR offset value for the transmission rank before the change and the SIR offset value for the transmission rank after the change as the SIR offset value for the transmission rank after the change. As a result, it is possible to select a more appropriate transmission rank without excessively continuing to use the past communication environment different from the current communication environment.

The CU 6 may achieve an optimum communication environment with the UE 2 by correcting a reception SIR with an SIR offset value, selecting an MCS corresponding to the corrected reception SIR, and controlling a physical channel to the UE 2 based on the selected MCS and the switched transmission rank.

Although the case where the second decision processing is executed after the first decision processing is executed is exemplified in the setting processing illustrated in FIG. 5, the first decision processing may be executed after the second decision processing is executed.

The case is exemplified in which the CU 6 selects a transmission rank of DL based on the reception SIR and SIR offset value of DL, and the selected transmission rank of DL is set to a PDSCH. However, the CU 6 may select a transmission rank of UL based on the reception SIR and SIR offset value of UL and set the selected transmission rank of UL to a PUSCH by a method similar to that used in the case of DL. It may be changed as appropriate. As a result, an optimum PUSCH may be secured. The difference from the case of DL is that a reception SIR of UL is estimated by using a reference signal of UL transmitted from the UE 2, and an SIR offset value corresponding to the transmission rank of a PUSCH is updated according to whether decoding of the PUSCH is successful.

All examples and conditional language provided herein are intended for the pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although one or more embodiments of the present disclosure have been described in detail, it should be understood that the various changes, substitutions, and alterations could be made hereto without departing from the spirit and scope of the disclosure.

What is claimed is:

1. A communication apparatus that communicates with a terminal device using a multi-input multi-output (MIMO) data transfer method, the communication apparatus comprising:
   a memory; and
   a processor coupled to the memory and configured to:
      estimate a reception signal to interference ratio (SIR) of a wireless propagation path between the communication apparatus and the terminal device;
      acquire an SIR offset value for a transmission rank based on a state of occurrence of transfer errors; and
      switch the transmission rank based on the reception SIR and an SIR offset value for the transmission rank,
   wherein the processor determines whether a fluctuation range of two SIR offset values sampled at a certain time interval is less than a threshold, and increases the transmission rank when determining that the fluctuation range of two SIR offset values is less than a threshold.

2. The communication apparatus according to claim 1, wherein the processor estimates the reception SIR based on channel quality information received from the terminal device, and switches the transmission rank based on the reception SIR and an SIR offset value for the transmission rank, when it is determined that reliability of the channel quality information received from the terminal device is low.

3. The communication apparatus according to claim 2, wherein the processor switches the transmission rank and sets a transmission rank after change to a downlink physical channel to the terminal device.

4. The communication apparatus according to claim 2, wherein the processor switches the transmission rank and sets a transmission rank after change to an uplink physical channel from the terminal device.

5. The communication apparatus according to claim 1, wherein the processor corrects the reception SIR with the SIR offset value, determines whether a corrected reception SIR has exceeded a threshold, and increases the transmission rank when that a corrected reception SIR has exceeded a threshold.

6. The communication apparatus according to claim 1, wherein the processor determines whether a difference between an SIR offset value for a current transmission rank and an SIR offset value for a transmission rank that is one rank lower than the current transmission rank has exceeded a threshold, and lowers the transmission rank when determining that the difference has exceeded the threshold.

7. The communication apparatus according to claim 1, wherein the processor determines whether transfer errors have occurred at a certain percentage in a certain number of times of data transfer after being changed to a current transmission rank, and lowers the transmission rank when determining that transfer errors have occurred at a certain percentage in a certain number of times of data transfer after change.

8. The communication apparatus according to claim 1, wherein the processor when the transmission rank is switched, replaces an SIR offset value with a result obtained by performing weighted addition of an SIR offset value for a transmission rank before change and an SIR offset value for a transmission rank after change as the SIR offset value for a transmission rank after change.

9. The communication apparatus according to claim 1, wherein the processor corrects an estimated value of the reception SIR with the SIR offset value, selects a modulation and coding scheme corresponding to the reception SIR after correction, and controls a physical channel to the terminal device based on a modulation and coding scheme and the transmission rank.

10. A wireless communication system comprising:
    a terminal device; and
    a communication apparatus including a processor configured to:
       communicate with the terminal device using a multi-input multi-output (MIMO) data transfer method, the communication apparatus comprising:
       estimate a reception signal to interference ratio (SIR) of a wireless propagation path between the communication apparatus and the terminal device;
       acquire an SIR offset value for a transmission rank based on a state of occurrence of transfer errors; and
       switch the transmission rank based on the reception SIR and an SIR offset value for the transmission rank,
    wherein the processor determines whether a fluctuation range of two SIR offset values sampled at a certain time interval is less than a threshold, and increases the transmission rank when determining that the fluctuation range of two SIR offset values is less than a threshold.

11. A transmission rank switching method comprising:
communicating, by a computer, with a terminal device using a multi-input multi-output (MIMO) data transfer method;
estimating a reception signal to interference ratio (SIR) of a wireless propagation path between the communication apparatus and the terminal device;
acquiring an SIR offset value for a transmission rank based on a state of occurrence of transfer errors; and
switching the transmission rank based on the reception SIR and an SIR offset value for the transmission rank,
wherein the transmission rank switching method further includes determining whether a fluctuation range of two SIR offset values sampled at a certain time interval is less than a threshold, and increasing the transmission rank when determining that the fluctuation range of two SIR offset values is less than a threshold.

* * * * *